United States Patent [19]
Guerin

[11] 3,823,780
[45] July 16, 1974

[54] COMPACT GROUND PREPARING ROLLER

[76] Inventor: Adolphe Crete Guerin, 98, route Nationale, Mezieres, France

[22] Filed: Aug. 8, 1972

[21] Appl. No.: 278,800

[30] Foreign Application Priority Data
Aug. 16, 1971 France.............................. 71.29867

[52] U.S. Cl................ 172/150, 172/53, 172/140, 172/199, 172/537
[51] Int. Cl.............................................. A01b 5/00
[58] Field of Search....... 172/53, 93, 101, 133, 140, 172/145, 147, 150, 160, 174, 197, 199, 532, 537, 417; 111/81, 85

[56] References Cited
UNITED STATES PATENTS

| | | | |
|---|---|---|---|
| 616,817 | 12/1898 | Baker............................ | 172/145 X |
| 623,179 | 4/1899 | Peet................................ | 172/150 |
| 654,354 | 7/1900 | Oldham........................... | 172/150 |
| 1,089,286 | 3/1914 | Suggs.............................. | 111/81 X |
| 1,198,684 | 9/1916 | Waugh et al..................... | 172/147 X |
| 1,764,944 | 6/1930 | Fisher.............................. | 172/150 |
| 2,284,172 | 5/1942 | Silver............................... | 172/145 X |
| 2,613,581 | 10/1952 | Pretzer............................. | 172/140 |
| 3,119,314 | 1/1964 | Schiel.............................. | 172/537 X |
| 3,209,841 | 10/1965 | Van der Lely................... | 172/140 X |
| 3,358,777 | 12/1967 | Groenke........................... | 172/417 |
| 3,398,707 | 8/1968 | McClenny......................... | 111/85 |
| 3,499,494 | 3/1970 | Gijzenberg....................... | 172/53 |

FOREIGN PATENTS OR APPLICATIONS

| | | | |
|---|---|---|---|
| 889,522 | 7/1949 | Germany.......................... | 172/532 |

Primary Examiner—Robert E. Pulfrey
Assistant Examiner—R. T. Rader
Attorney, Agent, or Firm—Karl W. Flocks

[57] ABSTRACT

Ground preparing device comprising a harrow frame and a roller frame, the teeth of the harrow disrupting the ground ahead of the roller and the roller compacting the earth behind the harrow, wherein a leveller deflector distributes the excess earth thicknesses.

1 Claim, 6 Drawing Figures

COMPACT GROUND PREPARING ROLLER

The present invention relates to a ground preparing roller and, more particularly, to a compact machine which harrows and rolls the ground in a single operation or sweep advantageously combined with a sowing device and a levelling guide for the preparation, for example, of a landscape gardener's turf.

It is known in the art to prepare the ground before sowing using the teeth of a harrow and then of a roller type clod-crusher which compacts the loose earth. However, when this technique is applied to large scale cultivation, it is generally necessary to use several specialised pieces of equipment which function in several successive operations. All these machines are of such a size that they cannot operate in a pleasure garden.

On the other hand, as regards turf cultivation, for example, it is possible to combine all operations into a single one, the device being of small dimensions and sufficiently handleable to adapt itself to paths that may be sinuous and varied in a pleasure garden.

This is why the invention provides a compact device comprising a roller combined with alternating harrow, the front harrow being provided with a levelling deflector, the height of which is adjustable with respect to the roller, a fertilizer spreader, a stone collector and a sowing device that may be placed respectively in front of the harrow, behind the roller and between the harrow and the roller to enable the operator to sow the turf in one single operation without otherwise preparing the ground.

The invention also relates to the process for preparing the ground in a single operation or sweep by active disruption by the teeth of a harrow, immediately followed by rolling by means of a roller of 450 kg., for example, per two metres' length i.e., with a ballasting of 225 kg. per running meter, combined, if required with fertilizer spreading, sowing and removal of undesirable foreign bodies in order to provide a humus without leaving a trace, rut or underlying level in which water might stay.

Other features and advantages will be brought out by the following description given with reference to the attached drawings and illustrating in a purely indicative and in no way limitative manner a form of embodiment of the invention.

Figure 1:
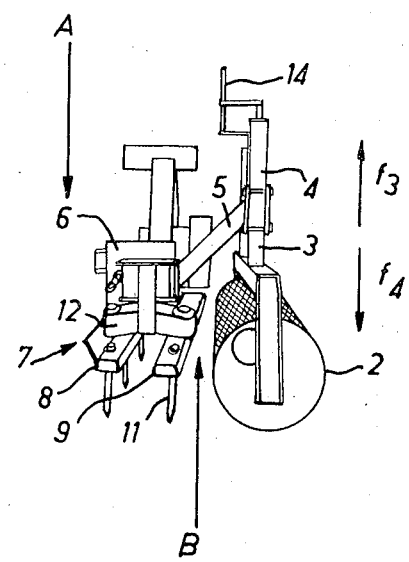
FIG. 1 is a side elevation of a ground preparing device according to the invention.
Figure 2:
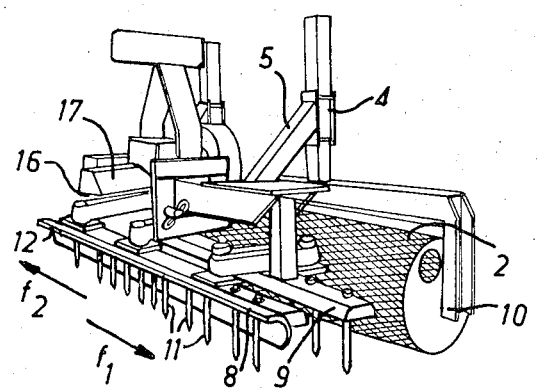
FIG. 2 is a perspective view of the device of FIG. 1.

FIG. 1 represents a frame mounted behind a tractor and whereon is mounted a roller 2 the bearing surface of which is constituted of expanded sheet metal. On columns 3 of the frame is slidably mounted a sleeve 4 rigidly connected by means of a breech 5 to the frame 6 of an alternating harrow generally indicated by 7 the twin elements 8 and 9 of which, provided with teeth 11, disrupt and level the ground ahead of the roller 2. The whole assembly forms a compact unit, the length from front to rear taken up by the harrow and the roller being, for example, 70 centimeters.

The harrow elements 8 and 9 are, when the machine is functioning, preferably driven in a known manner in an alternating movement in the direction of arrows $f_1$ and $f_2$ element 8 moving, for example, in the direction $f_2$ while element 9 moves in the opposite direction $f_1$. The apparatus thus tills the earth in depth, levelling and rolling it in the same sweep.

According to the invention, the forward element 8 bears a leveller deflector element 12 which distributes the clods such as 13 transversely with respect to the line of advance of the machine in order to subject the ground uniformly to the grinding action of teeth 11.

The frame 6 of harrow 7 may receive a spreader discharging fertilizer in plane A ahead the harrow, and the columns 3 of the frame of the roller may receive a sowing device which distributes the seed grains in plane B over the disrupted earth which the open expanded sheet metal roller 2 then covers and compacts.

Figure 3:
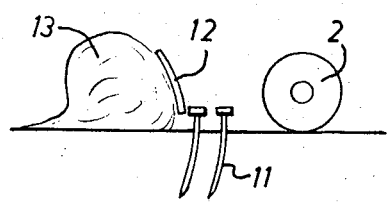
FIGS. 3 to 5 are assembly sketches.
Figure 4:
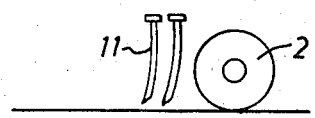
Figure 5:
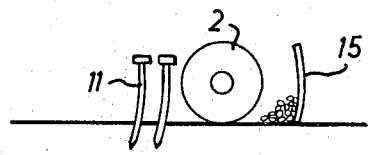

A lever such as 14 or another appropriate device enables a hydraulic jack or lifting screw (not represented) to be operated to displace columns 3 vertically upwards in direction $f_3$ or downwards in direction $f_4$. Breech 5 bearing frame 6 is thus operated, which enables the harrow to be lifted into rolling position (FIG. 4) or permits the adjustment of the penetration of teeth 11 in the levelling, harrowing position (FIG. 3) or in the finishing position (FIG. 5) through the entire working depth range required.

The machine may be more complete by addition of a dished collector rake 15 behind roller 2 to remove, for example, the roots and small stones brought to the surface when disrupting the ground.

The frame 6 of harrow 7 is made integral in a conventional way with the tractor hitch 20 and the tractor by the direct attachment to its hydraulic lifting arms, which enables this frame to be raised for reversing and delicate manoeuvering.

Figure 6:
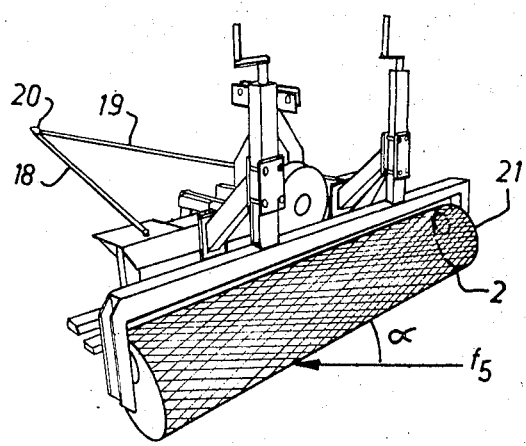
FIG. 6 is a perspective view of the device from the opposite side from the view of FIG. 2.

However, the invention provides special lifting arms 18 and 19 to enable the harrow and roller assembly to be angled with respect to the axis of the tractor path as shown in FIG. 6.

This arrangement is useful in the case of very stony ground, for the vibrations of the harrow cause the teeth to strike the stones, projecting them along the angled direction of arrows $f_5$ until they accumulate in lines at the extremity of the device.

In the latter case, the machine is driven in direction $f_5$ which forms a certain angle $\alpha$ with the axial direction of roller 2; the action of deflector leveller 12, combined with that of the alternating movement of element 8 then has the effect, over difficult and stony ground, of pushing aside the large stones into rows at the edge of the track in position 21.

In an alternative form of embodiment, the alternating harrow may be replaced by the rotary harrow and, in this case, the compact ground preparing assembly is given both a rotary and an alternating scissors movement.

It can be seen that the machine according to the invention combines the action of a harrow and that of a roller to prepare and sow the ground in a single operation without leaving underlying wheel marks or ruts that might collect water at various points underneath the turf. The device may be used on ploughed fields, garden works or on virgin soil.

It is understood that the present invention has been described with reference to its preferred indicative form of embodiment and that any equivalent means may be applied to its constitutive elements without departing from its scope as defined by the attached claims.

I claim:

1. A compact ground working machine of the rigidly mounted type for obtaining in a single operation at least the breaking and the rolling of the ground comprising a roller frame extending in a direction transverse to the direction of travel having a roller mounted thereon; said roller frame having at least one support column mounted perpendicular to said roller frame at one of its ends, said roller having a ground bearing surface of open mesh expanded metal;

a harrow frame located adjacent said roller frame and having two parallel parts with teeth mounted thereon for transverse reciprocating movement, and a leveling deflector means mounted at the front of said harrow frame;

a vertically slidable adjusting means to displace said harrow frame upwardly and downwardly in a direction perpendicular to the ground near said roller, mounted on said support column over said roller, and a jack connected to said adjusting means to move said adjusting means in relation to said roller frame;

a connecting member between said adjusting means and said harrow frame of a short length and angled downwardly from said adjusting means toward said harrow frame so as to place said harrow teeth immediately adjacent said roller whereby the machine is confined within a short length.

* * * * *